Oct. 7, 1958 M. H. ROSKE 2,855,113
HOPPER MECHANISMS FOR DISK-TYPE CAPACITORS AND THE LIKE
Filed July 29, 1955 7 Sheets-Sheet 1

*Inventor*
Milton H. Roske
By his Attorney

Oct. 7, 1958                M. H. ROSKE                2,855,113
HOPPER MECHANISMS FOR DISK-TYPE CAPACITORS AND THE LIKE
Filed July 29, 1955                                7 Sheets-Sheet 2
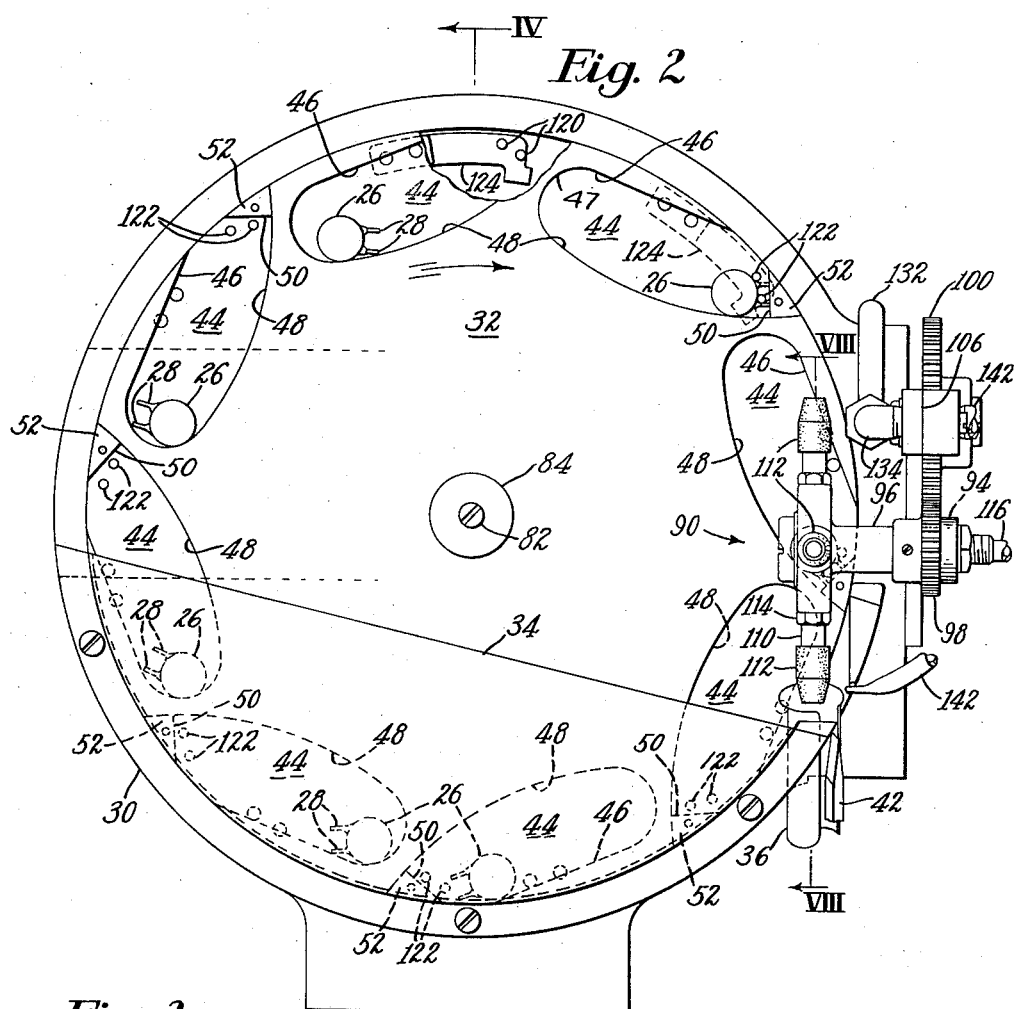
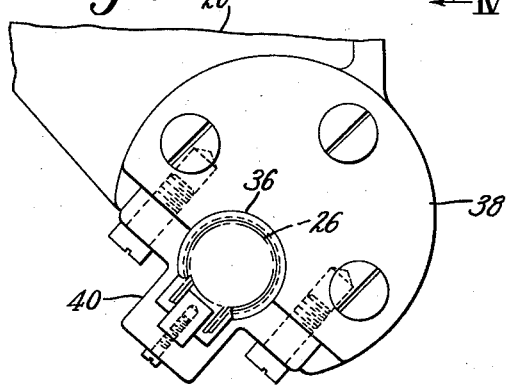
*Inventor*
Milton H. Roske
By his Attorney Inventor
Milton H. Roske
By his Attorney

*Inventor*
Milton H. Roske
By his Attorney

Oct. 7, 1958 M. H. ROSKE 2,855,113
HOPPER MECHANISMS FOR DISK-TYPE CAPACITORS AND THE LIKE
Filed July 29, 1955 7 Sheets-Sheet 5

*Inventor*
Milton H Roske
By his Attorney

Oct. 7, 1958  M. H. ROSKE  2,855,113
HOPPER MECHANISMS FOR DISK-TYPE CAPACITORS AND THE LIKE
Filed July 29, 1955  7 Sheets-Sheet 6
Fig. 10
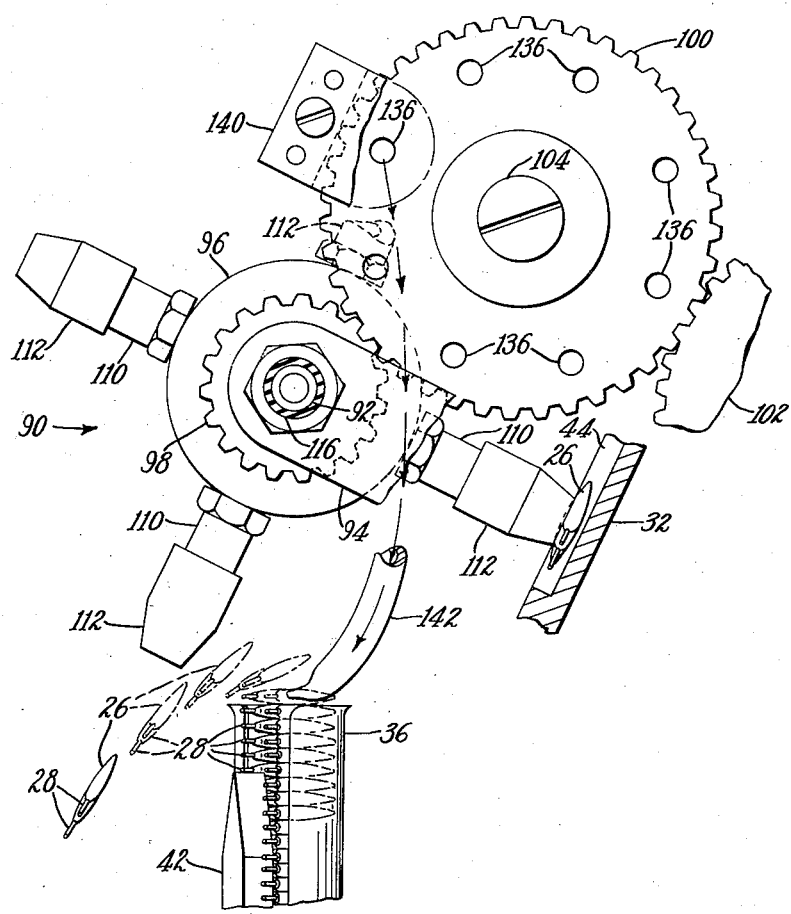
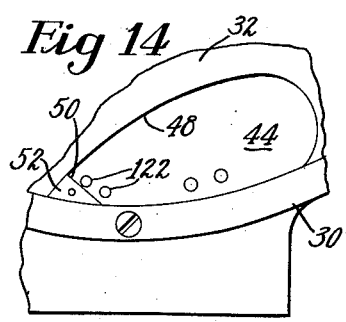
Fig 14
*Inventor*
Milton H Roske
By his Attorney Oct. 7, 1958 — M. H. ROSKE — 2,855,113
HOPPER MECHANISMS FOR DISK-TYPE CAPACITORS AND THE LIKE
Filed July 29, 1955 — 7 Sheets-Sheet 7

Inventor
Milton H. Roske
By his Attorney

United States Patent Office 2,855,113
Patented Oct. 7, 1958

2,855,113

HOPPER MECHANISMS FOR DISK-TYPE CAPACITORS AND THE LIKE

Milton H. Roske, Malden, Mass., assignor to United Shoe Machinery Corporation, Flemington, N. J., a corporation of New Jersey Application July 29, 1955, Serial No. 525,330

10 Claims. (Cl. 214—6)

This invention relates to mechanism for feeding work pieces successively in ordered arrangement, and more particularly to means for supplying from a random mass successive elements that are to be stacked in predetermined position preparatory to further processing such as packaging, installation, or other treatment. The invention is herein illustrated as embodied in a machine for successively delivering from bulk and in oriented manner articles having at least one projecting portion. More specifically the illustrated machine is designed continuously to supply disk-like articles having two radial projections lying in the general plane of the body of the article, for instance radial lead type electronic components, such as the ceramic or plastic encapsulated capacitors herein shown, but it will be understood that the invention is not limited to the illustrative construction and that the invention has application to the feeding of various types, shapes, and sizes of work pieces, and regardless of whether they are intended for electrical assemblies or otherwise.

Automatic assembly of electrical and electronic equipment ordinarily involves rapid, systematic manipulation of fasteners and other components that are to be successively and accurately installed. Many of the parts to be thus dealt with are fragile, relatively small, and frequently slightly inconsistent and irregular in configuration. For these reasons, and especially when components have slender projections, such as terminals in the form of slender tabs or wire leads which should remain undeformed, the problem of providing reliable means by which components can be quickly extracted in undamaged condition from a homogeneous supply and consecutively moved into predetermined position to be operated upon becomes difficult. In view of the foregoing it is an object of this invention to provide an improved device for safely segregating successive articles, for instance components having radial leads, from a supply en masse and delivering them individually in predetermined position.

To the end just stated and in accordance with one feature of the invention there is provided in novel combination for handling disk-type work pieces respectively having a projecting portion, a hopper device comprising an inclined rotary plate, a fixed annular frame cooperative with at least the lower portion of said plate to support a mass of the work pieces to be fed, said plate being formed with work-receiving recesses evenly spaced in one face thereof and extending angularly inward substantially from its periphery, the depth of each recess preferably accommodating the thickness of only one work piece, and the length of each recess along its inner wall extending slidably and revolubly to support the work piece, the outer end of each recess being formed to engage the projecting portion of the work piece and thereby predeterminedly position it, and means for transferring each work piece thus positioned from the hopper.

A further feature of the invention resides in the combination with a hopper and a rotary inclined hopper plate of the type having work-positioning recesses, of a chute adjacent thereto adapted to hold in stacked formation a plurality of work pieces similarly oriented, means for transferring correspondingly positioned work pieces from the successive plate recesses to the receiving end of said chute, said means including a movably mounted suction tool, and means for automatically returning any work piece not assuming a corresponding position in said recesses back to said hopper.

The above and other features of the invention together with various novel details of construction and combinations of parts will now be more particularly described in connection with an illustrative embodiment and with reference to the accompanying drawings thereof, in which:

Fig. 2 is a view of the hopper shown in Fig. 1 looking in the direction of the large arrow of the latter figure and disclosing a preferred form of recesses for positioning disk-type capacitors;

Fig. 3 is a plan view indicating the mounting of a tubular chute shown in Figs. 1 and 2;

Fig. 10 is a view in side elevation indicating the means by which an over-accumulation of stacked capacitors is returned to the hopper;

Fig. 14 is a view looking in the direction of the arrow in Fig. 1 and showing an alternate form of work positioning recess.

Figure 4:
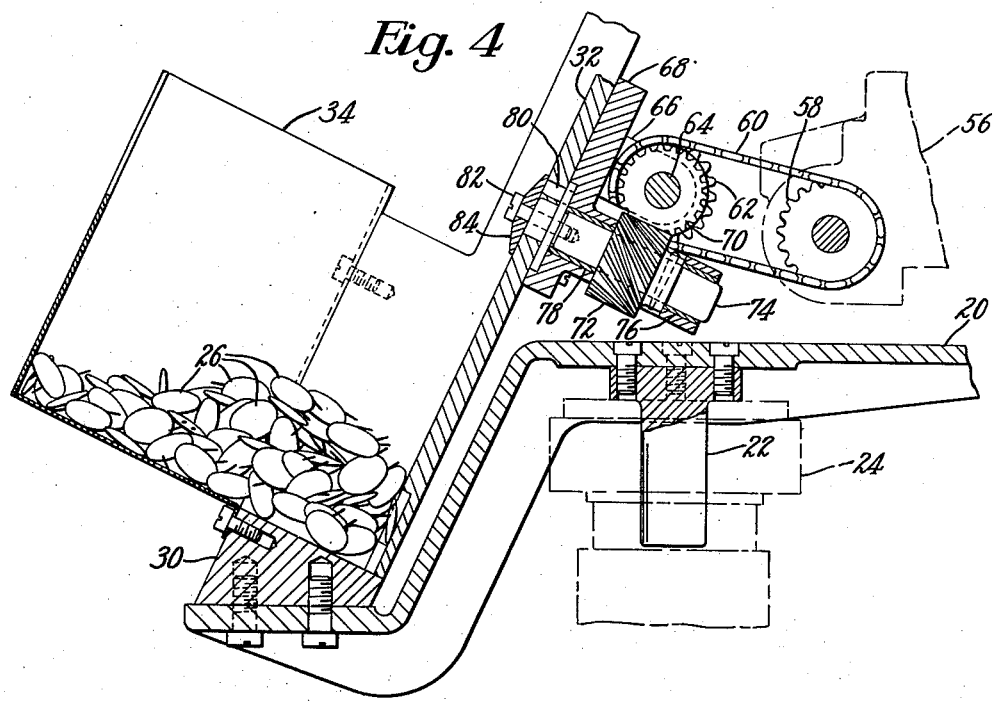
Fig. 4 is a section taken on the line IV—IV of Fig. 2.

The illustrative hopper mechanism is mounted for rotation about a vertical axis and comprises a frame 20 (Figs. 1 and 4) secured on a pivot 22 bearing in a socket member 24. The work to be dealt with, in this instance disk-type capacitors 26 somewhat elliptical in section and having pairs of radially projecting terminals, such as wire leads 28, respectively, is supported by a stationary annular wall 30 secured to the frame 20, a circular inclined bottom plate 32 rotatably mounted within the wall 30, and an open receptacle 34 of segmental shape affixed to the frame. The bottom of this receptacle merges with the wall 30 and is tilted so that the capacitors 26 loosely contained thereby as shown in Fig. 4 are free to move under the influence of gravity toward the bottom portion of the plate 32. It is the purpose of the mechanism to be described to move these capacitors singly from the mass and make them successively available in uniformly oriented formation. Accordingly, a vertical work-receiving chute in the form of a longitudinally slotted tube 36 (Figs. 1, 2, and 3) is affixed to the frame 20 by means of a bracket 38 and a clamping piece 40 screwed thereto. A pointed guide rod 42 secured to the piece 40 extends parallel to and just outside of the slot in the tube 36 to be straddled by the leads of the capacitors when oriented. The rod is slightly narrower than the distance between a capacitor's leads to permit the capacitors to fall into a stack in the tube, but be maintained therein in nearly identical angular position about a vertical axis.

Figure 11:
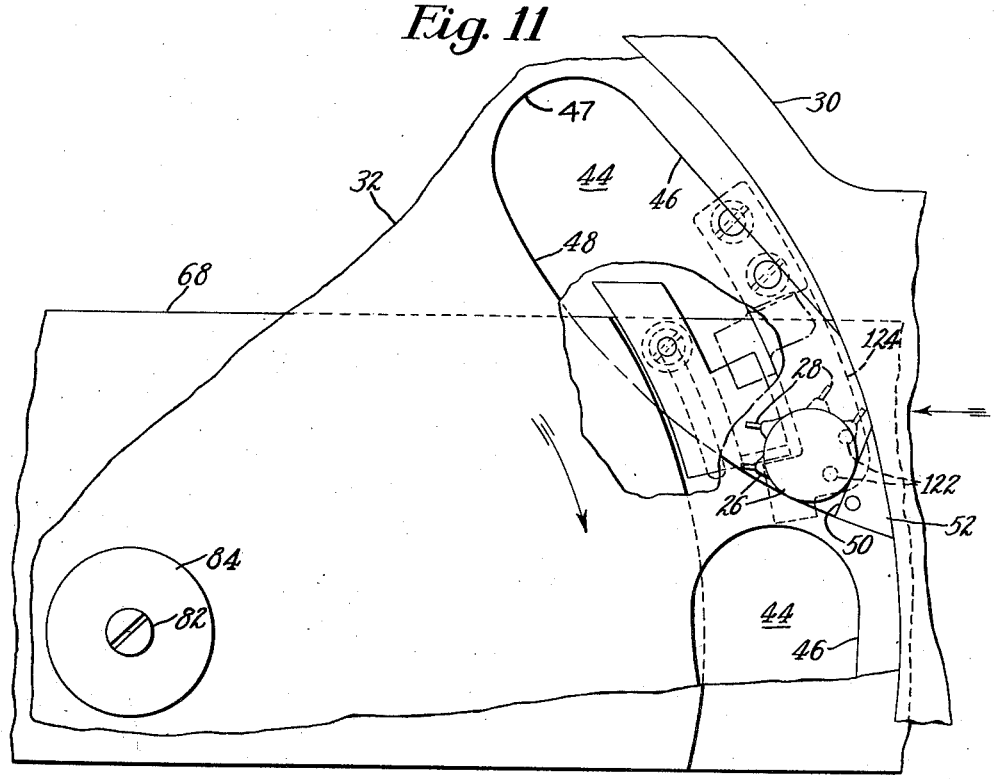
Fig. 11 is an enlarged view of the portion of the mechanism shown in Fig. 2, and indicating the means for ejecting improperly positioned capacitors.
Figure 12:
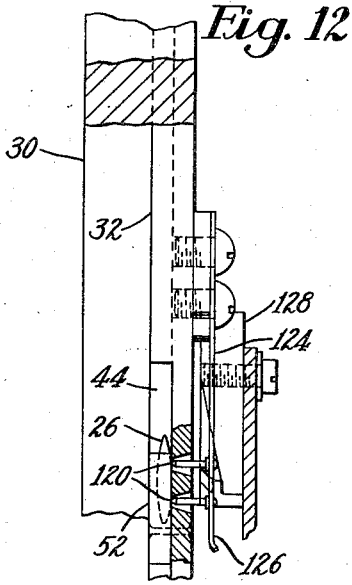
Figs. 12 and 13 are detail views partially in section looking in the direction of the arrow in Fig. 11 and showing successive stages in the operation of the ejector mechanism.
Figure 13:
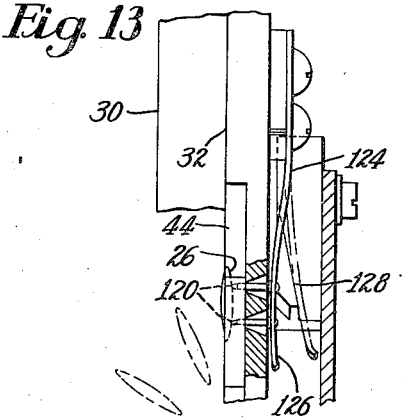

The plate 32 is provided with a series of evenly spaced work-receiving recesses 44 (Fig. 2) formed in its upper face. Each recess 44 extends inwardly and angularly from the periphery of the plate and has a depth adequate to accommodate only one component, as indicated in Figs. 10 and 12. An outer wall 46 of each recess may be substantially straight and initially serves as a shelf, when in its lowermost positions, down which a random capacitor 26 received from the supply will thereafter move under the influence of gravity to the convex end of wall of the recess as shown in Fig. 2. Inner walls 48 of the recesses are preferably convex and of sufficient length slidably to guide a capacitor outwardly toward the periphery. As may be visualized in Fig. 2, inner walls 48 are spaced from outer walls 46 so the width of each recess is greater than the longest dimension of the work pieces, and a capacitor may rotate edgewise on an inner wall 48 as the latter progresses upwardly toward a generally horizontal position and then slopes downwardly and to the right. Such relative rotation normally ceases when one of the projecting terminals 28 also engages the wall 48, and the capacitor thereupon slides edgewise bodily toward the plate periphery. The arrangement is such that in a rotation of the plate 32 about its axis each recess 44 will usually have picked up just one capacitor that will arrive, during the course of its outward movement along the inner wall 48, with its projecting lead portions extending ahead. Better to insure that the capacitors will, for the most part, assume uniformly corresponding positions as they approach the plate periphery, each recess 44 has its peripheral end provided with a positioning end face 50 (Figs. 2 and 11) disposed for engagement with the advance lead ends. For convenience in construction, this face 50 is shown as being afforded by a side of a triangular insert 52 secured in each peripheral end of the recesses 44 adjacent to the respective inner walls 48. It will be understood that for different work pieces having different projecting portions the configuration of the recesses 44, their number and spacing, the slope of the plate 32 and its speed of rotation, the shape of the face 50, and other factors may be suitably modified for optimum operation without departing from the scope of this invention.

Figure 5:
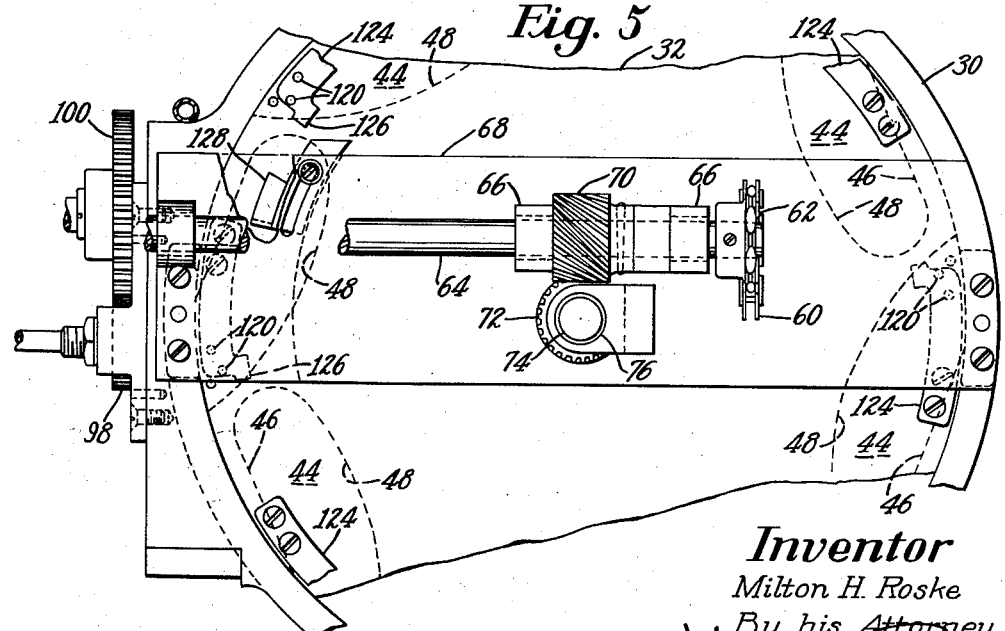
Fig. 5 is a view similar to Fig. 2, but looking in the reverse direction to disclose a portion of the driving mechanism seen in Fig. 1.

For rotatably driving the plate 32 (clockwise as viewed in Fig. 2) and associated mechanism later to be described, a motor 54 (Fig. 1) is secured on the frame 20 and, through reduction gearing (not shown) in a housing 56, continuously operates a sprocket 58 journaled therein. In this way a chain 60 meshing with the sprocket 58 drives a sprocket 62 (Figs. 1, 4, and 5) secured on a cross shaft 64. The latter is rotatably journaled in spaced bosses 66 integral with a member 68 spanning the underside of the plate 32 and secured at its ends to the annular wall 30. Referring more particularly to Fig. 4, a helical gear 70 fixed on the cross-shaft 64 is arranged to drive a helical gear 72 which is pinned on a stub-shaft 74 rotatable in sleeve bearings 76, 78 mounted in spaced cylindrical bearing portions formed on the member 68. The upper end of the stub-shaft is provided with a flange carrying a locking pin 80 that is seated in a bore formed in the plate 32. To secure this plate for rotation a screw 82 extends through a washer 84 and is threaded axially into the stub-shaft 74.

Figure 6:
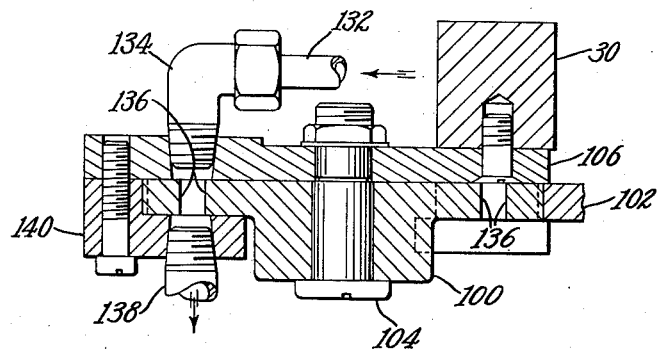
Fig. 6 is a section taken on the line VI—VI of Fig. 1, and showing a portion of pneumatic overflow control mechanism.
Figure 7:
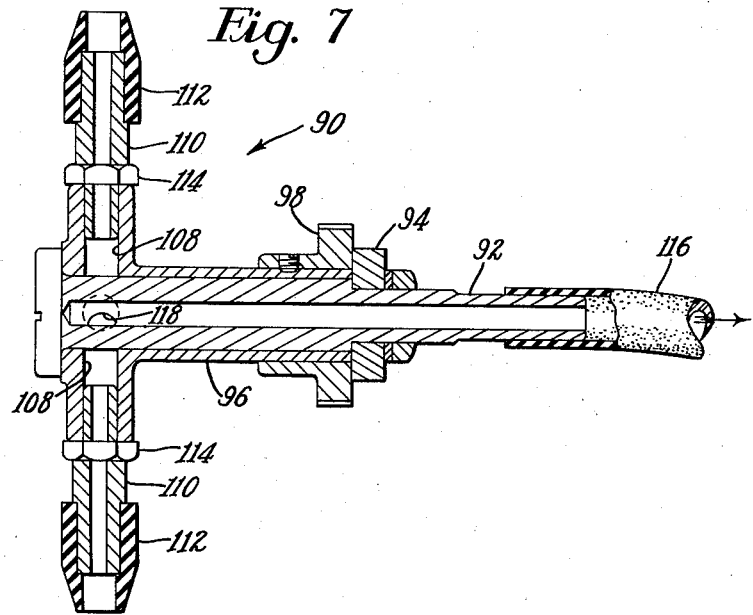
Fig. 7 is a section taken on the line VII—VII of Fig. 1, and showing details of pneumatic work transfer mechanism.
Figure 8:
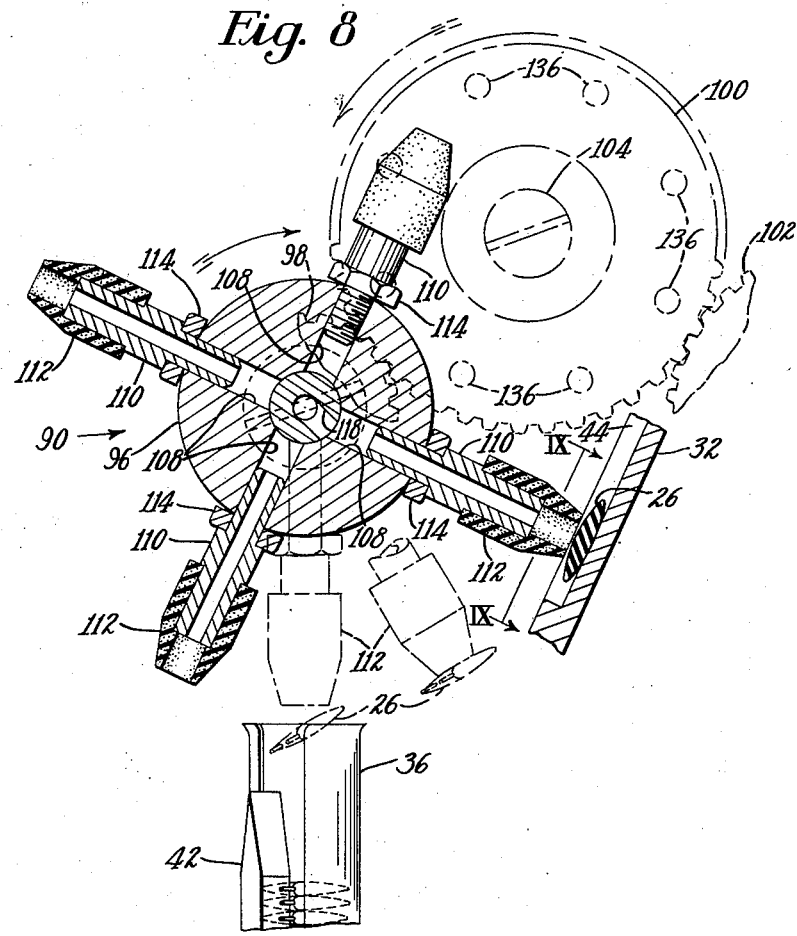
Fig. 8 is a view in side elevation and largely in section indicating the manner of operation of the work transfer mechanism.

Means next to be explained is provided whereby each of the capacitors 26, when predeterminedly positioned by the respective work-supporting recesses 44, will, at a point preferably near the level of the center of the plate 32, or slightly below, be transferred from the plate and deposited into the above-mentioned tube 36, the leads 28 straddling the guide rod 42. For this purpose, there being eight of the recesses 44, a four-armed transfer wheel generally designated 90 (Figs. 1, 2, 7, 8, and 10) is arranged for rotation in time relation to the plate 32. This wheel is mounted on an axially bored hub 92 (Fig. 7) that is affixedly supported in the upper end of a bracket 94 secured at its lower end to the frame 20. A rotor 96 on the hub 92 is driven by a pinion gear 98 meshing with an intermediate gear 100 that in turn is operated by a gear 102 mounted on the cross-shaft 64. The gear 100 is rotatable on a pivot stud 104 (Figs. 1 and 6) secured in a bracket 106 attached to the wall 30. An end of the rotor 96 is formed with four equally spaced radial bores 108, into each of which is adjustably threaded a tubular adapter 110, on the outer end of which is mounted a rubber pickup nozzle 112. The arrangement is such that when the adapters are properly inserted and held by their respective locking nuts 114, the outer extremities of the nozzles 112 will successively come in close proximity with the centers of the body portions of the successively positioned capacitors, as indicated in Fig. 8. To enable each successive nozzle gently to pick up a properly positioned capacitor at the proper instant and without changing its orientation, one end of the bore of the hub 92 is in communication with a source of reduced pressure by means of a tube 116, and the other end of the bore of the hub 92 connects with a radial aperture 118. The position of the latter is such that as each bore 108 traverses the aperture 118 a positioned capacitor is lifted by suction and carried by a nozzle 112 until, when directly over the mouth of the tube 36, suction through the bore 108 is effectively terminated, and the capacitor drops into the stacked formation shown in Figs. 8 and 10.

Figure 9:
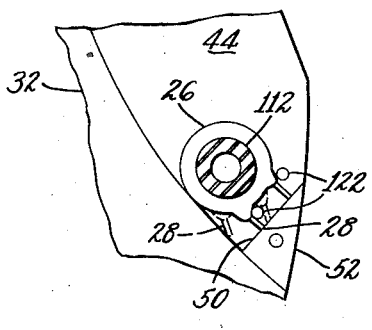
Fig. 9 is a section taken on the line IX—IX of Fig. 8, and indicating the permissible range of positioning of disk-type capacitors at the instant prior to their transfer.

Not every capictor segregated by a recess 44 for positioning will be correctly positioned within allowable limits, though experience indicates a high percentage of proper positioning is obtained when work pieces are reasonably uniform. Though the rate of rotation of the plate 32 is usually quite low to avoid harming the work pieces, a very satisfactory output of positioned work is obtained. In order to avoid transferring any improperly positioned capacitors to the tube 36, automatic ejector mechanism is arranged to be actuated just ahead of the capacitor pickup point of the wheel 90. Thus, a pair of ejector pins 120, 120 (Figs. 2, 5, 11, 12, and 13) is disposed to be projected through holes 122, 122 (Fig. 9) respectively, formed in the plate 32. These holes are so located in each recess 44 adjacent to the positioning end face 50 that when the pins 120 are thrust upwardly therethrough by means to be described, a properly positioned capacitor will not be engaged thereby, but incorrectly positioned capacitors (see Fig. 11) will overlie the holes and be ejected by the pins to fall back into the receptacle 34. The pairs of pins 120 are affixed to leaf springs 124 respectively secured at their trailing ends to the underside of the plate 32 and extending adjacent to its periphery. In some instances, depending on the size and shape of the workpieces, it is preferable to mount three spaced ejector pins on each spring 124 instead of two, the third pin being effective rearwardly of the advance pair to remove a second work piece, if any, which may be adjacent to the one to be positioned and stacked. The leading ends of the respective springs 124 have a tongue 126 disposed to engage and ride upwardly over a fixed cam 128 (Figs. 5 and 11) adjustably secured by bolt and slot connection on the upper side of the member 68. Successive springs 124 are accordingly deflected by the cam 128 from the plate 32 and then permitted to snap toward it, the pins 120 forcibly ejecting a capacitor which is not suitably positioned for transfer by the wheel 90.

Figure 1:
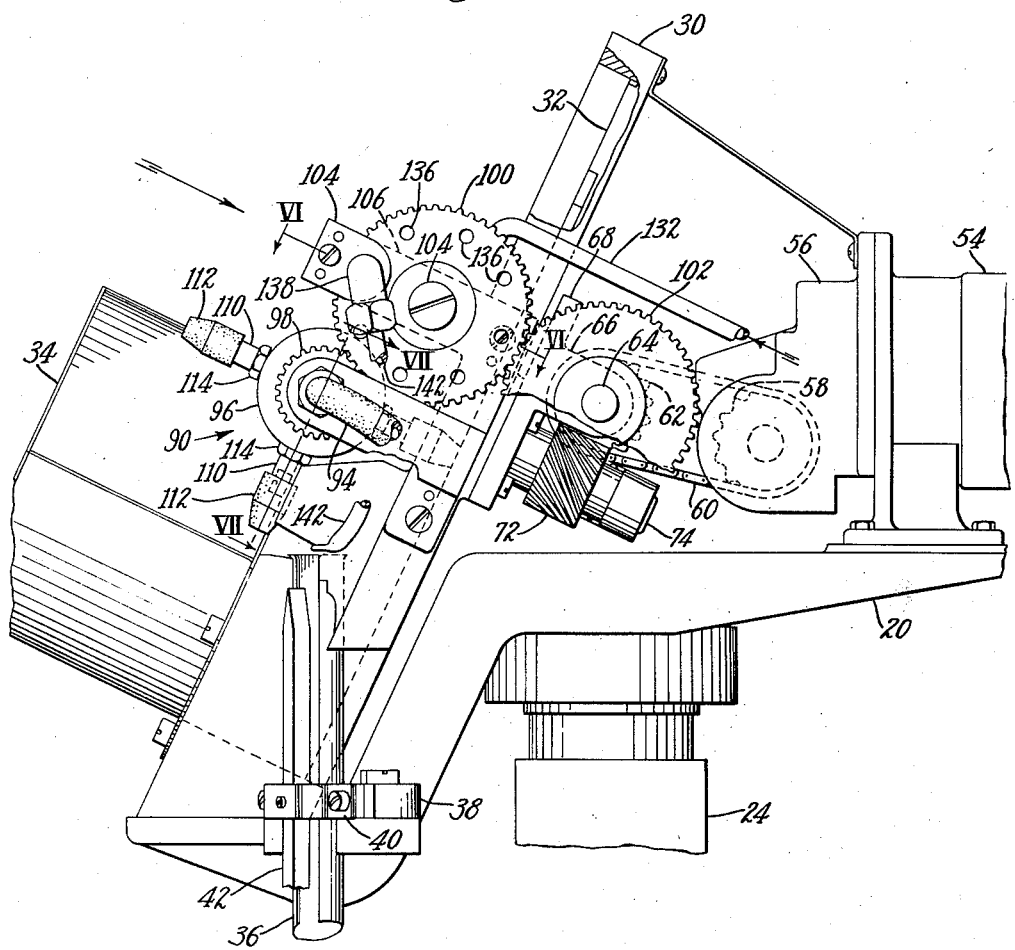
Fig. 1 is a view in side elevation of hopper mechanism embodying this invention, portions being broken away to reveal construction.

Usually the requirements of an inserting or packaging machine or the like can more than be met by the feeding mechanism herein described, and accordingly, means is provided for automatically returning any excess capacitors from the top of the fully stacked tube 36 to the receptacle 34, while permitting the continuously operative hopper mechanism to maintain the chute with a full reserve supply of similarly stacked capacitors. Referring to Fig. 1, a tube 132 is connected to a source of air under pressure which is thus directed via an elbow coupling 134 (Fig. 6) threaded into the bracket 106 to one side of the gear 100. The latter is provided with eight concentrically disposed holes 136 arranged successively to be alined with the exit end of the coupling 134. An elbow 138 disposed on the other side of the gear 100 is threaded into a bracket 140 secured to the bracket 106 and hence, when a hole 136 affords passageway between the elbows 134, 138, a jet of air under pressure is directed from the latter and through a tube 142. The lower end of the tube 142 is arranged to emit intermittent air blasts across the mouth of the tube 36, each blast thus being timed to act on an excess capacitor (if any) which has just been deposited by a nozzle 112 on the top of the stack, but being too late to disturb a just-deposited capacitor which may have space to occupy within the tube. An excess capacitor displaced by the jet of air is thus automatically returned to the receptacle 34 for refeeding.

From the foregoing it will be apparent that this invention affords an effective and compact device by which, with minor modifications if need be, a large variety of disk-type components may be successively fed into predetermined position from bulk supply.

Having thus described my invention, what I claim as new and desire to secure by Letters Patent of the United States is:

1. Mechanism for carrying disk-like articles from a bulk supply and delivering them successively in predetermined position, said articles having at least one projecting portion respectively, comprising a hopper, a rotary inclined plate having a face disposed for engagement with the articles therein, said face being formed with equispaced recesses extending angularly inward substantially from its periphery, means for rotating the plate about an axis to cause the articles to be lifted edgewise in the successive recesses and thus to traverse the outer and then the inner edge thereof, an insert disposed in the peripheral end of each recess to be engaged by the projecting portion of an article to predeterminedly position it in cooperation with said inner edge, a receptacle for holding the articles in ordered arrangement, and means cooperative with the successive recesses at a point in their path to transfer the positioned articles for deposit in said receptacle.

2. A machine as set forth in claim 1 and further characterized in that said transfer means consists of a suction tool mounted for movement in time relation with said rotary plate.

3. A machine as set forth in claim 2 and further characterized in that said suction tool comprises a wheel having a plurality of pickup nozzles respectively movable to transfer each positioned article from its recess to the mouth of said receptacle, means for connecting the nozzles successively with a source of suction to effect said transfer, and means for disconnecting the successive nozzles with said source as they pass in proximity to said mouth whereby the positioned articles are deposited therein.

4. Hopper mechanism for handling disk-type capacitors provided with projecting leads comprising a rotary inclined plate having elongated work-supporting recesses spaced peripherally in its upper face, means for rotating said plate through a hopper to cause a capacitor to travel first inwardly along the outer edge of a recess and then outwardly along the inner edge of the recess, an insert in each recess disposed adjacent to the periphery of the plate for engaging at least one of the leads of a capacitor to predeterminedly position it in cooperation with the inner edge of the recess, and means cooperative with the successive recesses at a common point in their travel for transferring therefrom the positioned capacitors therein.

5. Hopper mechanism as defined in claim 4 and further characterized in that ejector mechanism is disposed in the path of travel of said recesses ahead of said capacitor transferring means for automatically returning to said hopper any capacitor failing to assume the predetermined position determined by the insert and said inner recess edge.

6. Hopper mechanism as set forth in claim 4 and further characterized in that a slotted tubular chute is vertically disposed to receive the positioned capacitors successively transferred, a pointed guide rod being mounted adjacent to the slot of said chute to be straddled by the leads of each capacitor.

7. Hopper mechanism as set forth in claim 6 and further characterized in that means is provided for returning capacitors which are excess to the stacking content of said chute to the hopper.

8. Hopper mechanism as set forth in claim 7 and further characterized in that said returning means comprises a tube directed across the mouth of said chute, said tube having intermittently interruptable communication with a source of air under pressure.

9. Mechanism for segregating disk-like workpieces successively from a random supply in a hopper comprising a rotary inclined plate constituting the bottom of at least a portion of said hopper, the upper face of said plate being formed with work receiving recesses each having an outer wall extending from the periphery of the plate angularly inwardly in a direction opposite to the direction of rotation of the plate and an inner wall extending from the periphery of the plate and spaced from said outer wall a distance greater than the larger dimension of the workpiece, said recesses each having an end wall extending between said inner wall and said outer wall, the depth of each recess accommodating the thickness of only one workpiece, and means for rotating said plate in said direction to cause the workpieces in successive recesses initially to be supported edgewise on the outer walls thereof and then to progress bodily along the inner walls thereof until the workpieces assume substantially uniform positions within their recesses.

10. Mechanism as set forth in claim 9 and further characterized in that said outer wall is substantially straight, said end wall is convex, said inner wall is less convex than said end wall, and a work positioning edge face is disposed adjacent to the plate periphery at an angle to said end wall.

References Cited in the file of this patent

UNITED STATES PATENTS

| | | |
|---|---|---|
| 887,298 | Wilmore | May 12, 1908 |
| 1,456,546 | Gleason | May 29, 1923 |
| 2,332,249 | Nielsen | Oct. 19, 1943 |